(12) United States Patent
Myers

(10) Patent No.: US 9,970,502 B2
(45) Date of Patent: May 15, 2018

(54) ANNULAR SPRING SYSTEM

(71) Applicant: Firestone Industrial Products Company, LLC, Indianapolis, IN (US)

(72) Inventor: James R. Myers, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days. days.

(21) Appl. No.: 14/955,673

(22) Filed: Dec. 1, 2015

(65) Prior Publication Data

US 2016/0084334 A1    Mar. 24, 2016

Related U.S. Application Data

(63) Continuation of application No. PCT/US2014/041340, filed on Jun. 6, 2014.

(60) Provisional application No. 61/831,831, filed on Jun. 6, 2013.

(51) Int. Cl.
*F16F 1/373* (2006.01)
*F16F 1/40* (2006.01)
*F16F 9/02* (2006.01)

(52) U.S. Cl.
CPC ............. *F16F 1/3732* (2013.01); *F16F 1/40* (2013.01); *F16F 1/403* (2013.01); *F16F 9/0218* (2013.01); *F16F 9/0281* (2013.01)

(58) Field of Classification Search
CPC ...... F16F 1/34; F16F 1/40; F16F 1/403; F16F 1/3615; F16F 1/3732; F16F 3/12; F16F 9/0218; F16F 9/0281; F16F 15/00; F16B 43/00; B60G 11/62; B60G 17/052; B30B 15/061; B63B 2021/005; B61G 11/16

USPC ... 267/113, 140.4, 141.1, 35, 152, 153, 207, 267/219, 293, 294
See application file for complete search history.

(56) References Cited

U.S. PATENT DOCUMENTS

| 28,619 | A | 6/1860 | Vose |
| RE1,194 | E | 6/1861 | Vose |
| 107,034 | A * | 9/1870 | Gardiner ................ F16F 1/40 213/45 |
| 264,921 | A | 9/1882 | Bemis |
| 2,117,264 | A * | 5/1938 | Workman ............ F16F 1/3732 267/141.1 |
| 2,486,741 | A | 11/1949 | Gabriel |
| 3,086,765 | A | 4/1963 | Zanow |
| 3,134,585 | A | 5/1964 | Trask |

(Continued)

FOREIGN PATENT DOCUMENTS

| JP | 2006-029398 A | 2/2006 |
| JP | 2007-255512 A | 10/2007 |
| KR | 10-0934378 B1 | 12/2009 |

OTHER PUBLICATIONS

Notification Concerning Transmittal of International Preliminary Report on Patentability dated Dec. 17, 2015 for International Application No. PCT/US2014/041340 (8 pages).

*Primary Examiner* — Robert A. Siconolfi
*Assistant Examiner* — San Aung
(74) *Attorney, Agent, or Firm* — Taylor IP, P.C.

(57) ABSTRACT

An annular spring assembly includes an annular spring, an annular first container including a first well and an annular second container including a second well. The first well and second well open towards one another and hold the annular spring therebetween. The second well is configured to telescopically receive the first well when the annular spring is compressed.

20 Claims, 4 Drawing Sheets

(56) References Cited

U.S. PATENT DOCUMENTS

| | | | |
|---|---|---|---|
| 3,375,000 A | | 3/1968 | Seamands et al. |
| 3,402,925 A | * | 9/1968 | Schwiebert ........... F16F 1/3732 |
| | | | 267/141 |
| 3,434,708 A | | 3/1969 | Hawk, Jr. |
| 3,515,382 A | | 6/1970 | Gallagher |
| 3,604,306 A | * | 9/1971 | Denholm ................ F16B 43/00 |
| | | | 248/649 |
| 3,606,295 A | | 9/1971 | Appleton |
| 3,608,883 A | | 9/1971 | Russold et al. |
| 3,871,634 A | | 3/1975 | Russold et al. |
| 3,997,151 A | | 12/1976 | Leingang |
| 4,211,429 A | * | 7/1980 | Howard .................. B60G 11/62 |
| | | | 267/219 |
| 4,415,146 A | | 11/1983 | Sitko |
| 4,473,216 A | | 9/1984 | Paton et al. |
| 4,968,010 A | | 11/1990 | Odobasic |
| 5,104,101 A | | 4/1992 | Anderson et al. |
| 5,180,268 A | * | 1/1993 | Richardson .......... B23Q 1/4828 |
| | | | 411/149 |
| 5,746,411 A | * | 5/1998 | Bruas .................... F16F 1/3713 |
| | | | 248/632 |
| 6,443,437 B1 | | 9/2002 | Beyene et al. |

\* cited by examiner

ANNULAR SPRING SYSTEM

CROSS REFERENCE TO RELATED APPLICATIONS

This is a continuation of PCT application No. PCT/US2014/041340, entitled "ANNULAR SPRING SYSTEM", filed Jun. 6, 2014, which is incorporated herein by reference.

BACKGROUND OF THE INVENTION

1. Field of the Invention

The present invention relates to spring systems, and, more particularly, to annular spring systems.

2. Description of the Related Art

Modular spring systems are known that combine multiple spring assemblies in a series. The series can utilize spring assemblies with different properties to precisely control the overall spring behavior of the spring system. One known modular spring system includes multiple spring assemblies that include a spring sandwiched between a top plate and a bottom plate. These spring assemblies are then stacked with top plates contacting bottom plates to produce a spring system.

What is needed in the art is a spring assembly that can be used to produce a modular spring system.

SUMMARY OF THE INVENTION

The present invention provides an annular spring assembly which includes an annular spring sandwiched between two containers that can telescopically interact with one another.

The invention in one form is directed to an annular spring assembly that includes an annular spring; an annular first container including a first well; and an annular second container including a second well. The first well and the second well open towards one another and hold the annular spring therebetween. The second well is configured to telescopically receive the first well when the annular spring is compressed.

The invention in another form is directed to a spring system that includes a first spring assembly and a second spring assembly. The first spring assembly and the second spring assembly both respectively include an annular spring; an annular first container including a first well and a first side opposing the first well; and an annular second container including a second well and a second side opposing the second well. The first well and the second well open towards one another and hold the annular spring therebetween. The second well is configured for telescopically receiving the first well when the annular spring is compressed and the second side of the second container of the second spring assembly is positioned adjacent to the first side of the first container of the first spring assembly.

The invention in yet another form is directed to a method of forming a spring system that includes providing a first spring assembly and a second spring assembly. The first spring assembly and the second spring assembly both respectively include an annular spring; an annular first container including a first well and a first side opposing the first well; and an annular second container including a second well and a second side opposing the second well. The first well and the second well open towards one another and hold the spring therebetween. The second well is configured for telescopically receiving the first well when the annular spring is compressed. The second side of the second container of the second spring assembly is positioned adjacent to the first side of the first container of the first spring assembly.

An advantage of the present invention is modular annular spring assembly which is simple in design.

Another advantage of the present invention is that the annular spring assembly can include opposing containers which telescopically interact with one another to capture the annular spring material and maintain a stable structure during compression of the annular spring.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
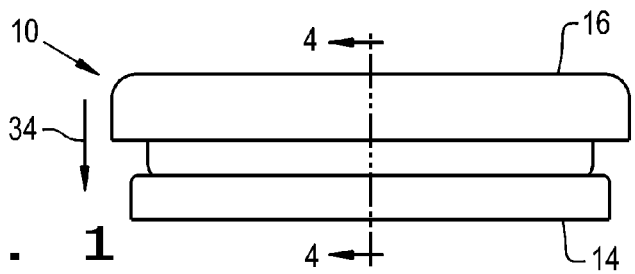
FIG. 1 is a side view of the spring assembly according to the present invention.
Figure 2:
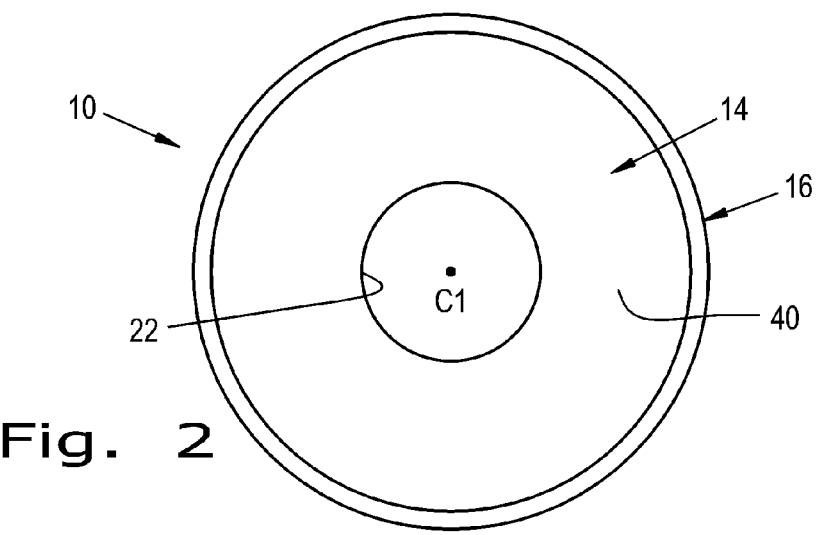
FIG. 2 is a bottom view of the spring assembly of FIG. 1.
Figure 3:
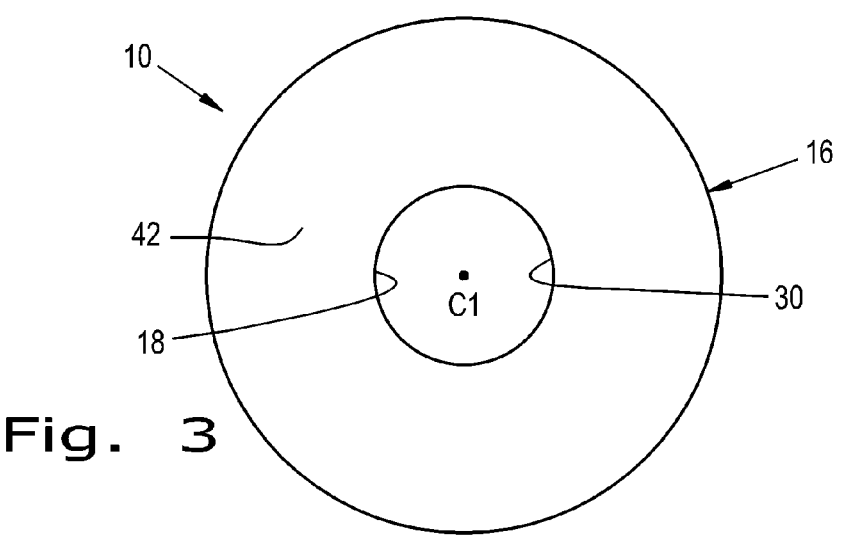
FIG. 3 is a top view of the spring assembly of FIG. 1.

Referring now to the drawings, and more particularly to FIGS. 1-4, there is shown an annular spring assembly 10, which can be referred to as a composite annular spring assembly. Spring assembly 10 includes an annular spring 12, an annular first container 14, and an annular second container 16. The spring assembly 10 generally has a toroidal (doughnut) shape and thus defines a through-hole 18 through the spring assembly 10. FIGS. 1-4 show that the annular spring 12 is sandwiched between the first container 14 (which can be referred to as the bottom container 14) and the second container 16 (which can be referred to as the top container 16). As can be seen in FIGS. 1-3, the spring assembly 10 can have a geometric center C1 that is the center point of the through-hole 18. The annular spring 12, annular first container 14 and annular second container 16 can each have respective geometric centers C2, C3 and C4 (shown in FIGS. 5-7) that align on a common axis, shown as line 4-4 in FIG. 1, where geometric center C1 lies. Such an arrangement allows for the modular spring system 10 to be easily aligned in a series, which is disclosed below.

Figure 4:
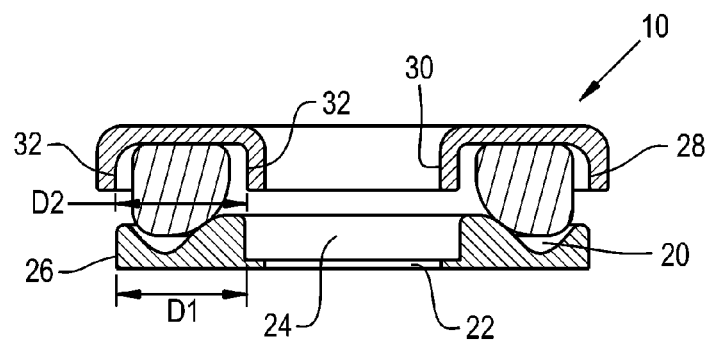
FIG. 4 is a cross-sectional view of the spring assembly of FIG. 1, the cross-section being taken along line 4-4 of FIG. 1.
Figure 5:
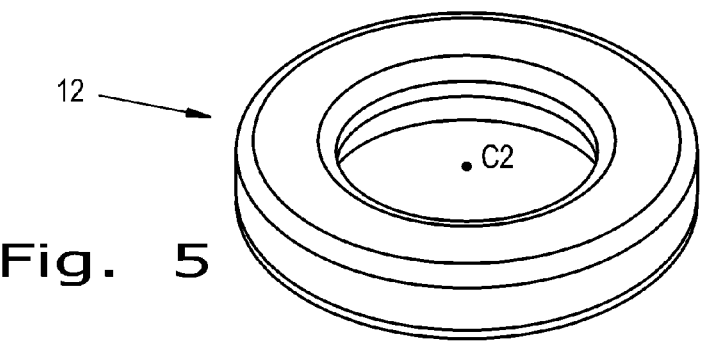
FIG. 5 is a perspective view of an annular spring of the spring assembly of FIG. 1.

FIG. 5 shows a perspective view of the annular spring 12, and FIG. 4 shows a cross-section of the annular spring 12. The annular spring 12 can be made out of urethane, microcellular urethane or rubber with different densities and different shapes to make up the desired spring rate. These materials are provided by way of example and not by way of limitation; thus, the annular spring 12 can be made out of many different materials. Additionally, the annular spring 12 could be configured as an air spring or any other type of spring. As shown in FIGS. 1 and 4, annular spring 12 is positioned between first container 14 and second container 16. Stated another way, the annular spring material 12 is mounted in the middle of the first and second containers 14, 16. FIG. 5 shows that annular spring 12 generally has a toroidal shape. Further, FIG. 4 shows that annular spring 12 can have a cross-sectional shape which has, for example, three corners each with a relatively small radius and another corner with a relatively large radius. This shape is provided by way of example and not by way of limitation. The shape of the annular spring 12 is designed to cooperate with the shape of the wells 20, 28 of the bottom and top containers 14, 16 to provide the desired spring rate and travel.

Figure 6:
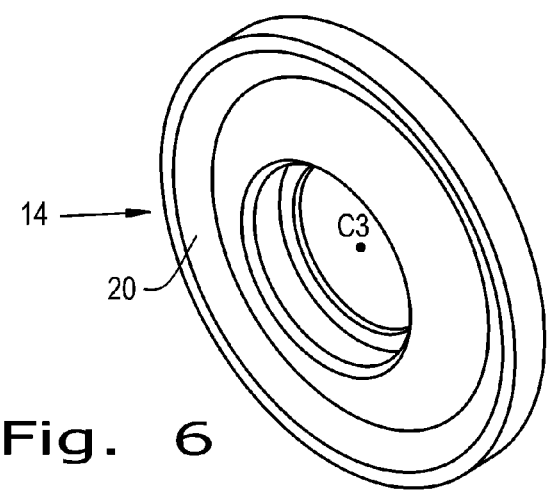
FIG. 6 is a perspective view of the bottom container of the spring assembly of FIG. 1.

The bottom container 14 includes a first well 20 (which can be referred to as the bottom well 20). The bottom container 14 can made out of a strong material that is able to contain the annular spring 12 (which can be referred to as the spring 12 or inner material 12) without defecting or otherwise deflecting or deforming. Such suitable material for the bottom container 14 includes steel, aluminum, or carbon fiber; these materials are provided by way of example and not by way of limitation. The bottom container 14 can be made by machining, molding, casting, stamping, folding, and/or any other suitable manufacturing process. FIGS. 4 and 6 show that the bottom well 20 can have a contour which cooperates with the design of the spring 12. The contour of the bottom well 20 shown in the drawings is provided by way of example and not by way of limitation. Thus, the bottom container 14 can have different profiles (similar, for example, to pistons on a rolling lobe air spring). The bottom container 14 has an inner diameter 22. Further, the bottom well 20 has an inner diameter 24 and an outer diameter 26 (the outer diameter 26 of the bottom well 20 corresponding to the outer diameter of the bottom container 14). The radial distance extending between the inner diameter 24 of the bottom well 20 to the outer diameter 26 of the bottom well 20 is referred to as an outer radial distance D1 of the bottom well.

Figure 7:
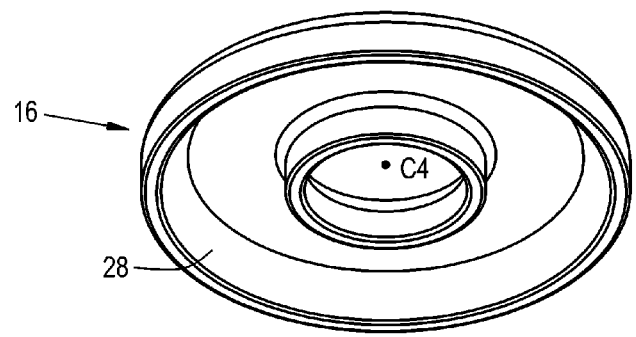
FIG. 7 is a perspective view of the top container of the spring assembly of FIG. 1.

The top container 16 includes a second well 28 (which can be referred to as the top well 28). The top container 16 can made out of a strong material that is able to contain the spring 12 without defecting or otherwise deflecting or deforming. Such suitable material for the top container includes steel, aluminum, or carbon fiber; these materials are provided by way of example and not by way of limitation. The top container 16 can be made by machining, molding, casting, stamping, folding, and/or any other suitable manufacturing process. FIG. 7 shows that the top well 28 can be shaped in a cup profile and thus have a generally U-shaped cross-section. Stated another way, the top well 28 can be a substantially cup-shaped well 28. This shape is provided by way of example and not by way of limitation. The top well 28 and the bottom well 20 are open towards one another and thereby hold the spring 12 therebetween.

The top container 16 has an inner diameter 30. The inner diameter 30 of the top container 16 aligns with the inner diameter 22 of the bottom container 14; stated another way, the measurement of the inner diameter 30 of the top container 16 can be the same as inner diameter 22 of the bottom container 14, as shown in the drawings. The top well 28 has an inner surface 32 which has a radial distance extending from one end to the other end of the top well; this radial distance of the top well 28 being referred to as an inner radial distance D2 of the top well 28. The inner radial distance D2 of the top well 28 is greater than the outer radial distance D1 of the bottom well 20. Further, the top well 28 and the bottom well 20 are aligned such that the top well 28 is configured for telescopically receiving the bottom well 20 when the spring 12 is compressed a predetermined amount. When the spring 12 is in a non-compressed condition, the top well 28 does not necessarily telescopically receive the bottom well 20, as shown in FIGS. 1 and 4. When the spring 12 is in a fully compressed condition (for example, in the direction 34 as shown in FIG. 1), the top well 28 can at least partially receive the bottom well 20.

The annular spring assembly 10 can be a modular spring assembly. That is, the annular spring assembly 10 can be a self-contained device in a given application. This modular spring assembly 10 can function alone or with other such modular spring assemblies 10, as disclosed below.

Figure 8:
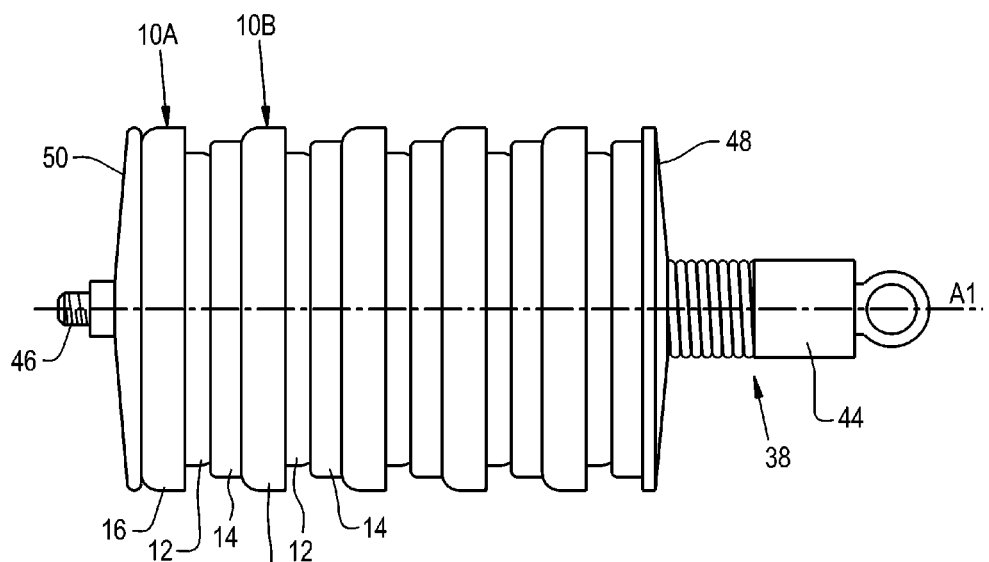
FIG. 8 is a side view of a spring system used in connection with a damper, the spring system including a plurality of the spring assemblies of FIG. 1.

FIG. 8 shows a spring system 36 according to the present invention. To form the spring system 36, the annular spring assemblies 10 are stacked on top of each other to achieve the spring length and travel needed. As described above, each spring assembly 10 can have a geometric center C1. Each individual spring assembly 10 can be stacked on top of each other so that their respective geometric centers C1 align on a common axis A to promote more even force distribution throughout the spring system 36. The spring assemblies 10 can be stacked on or over a damper 38 (as shown in FIG. 8), which runs along the common axis A, and used in an automotive suspension, but the spring assembly 10 (or the spring system 36) can be used by itself in the industrial market.

Thus, the spring system 36 of the present invention includes two spring assemblies 10 as described above. The two spring assemblies 10 can be referred to as a first spring assembly 10A (which can be referred to as the top spring assembly 10A) and a second spring assembly 10B (which can be referred to as the bottom spring assembly B). Each of the top spring assembly 10A and the bottom spring assembly 10B are substantially the same and correspond to the spring assembly 10 described above. As described above, each of the top spring assembly 10A and the bottom spring assembly 10B respectively include an annular spring 12; an annular first container 14 (the bottom container 14) including a first well 20 (the bottom well 20) and a first side 40 (the bottom side 40) opposing the bottom well 20; and an annular second container 16 (the top container 16) including a second well 28 (the top well 28), which can be substantially cup-shaped, and a second side 42 (the top side 42) opposing the top well 28, the bottom well 20 and the top well 28 being open towards one another and holding the annular spring 12 therebetween, the top well 28 being configured for telescopically receiving the bottom well 20 when the annular spring 12 is compressed. The top side 42 of the top container 16 of the bottom spring assembly 10B is positioned adjacent to the bottom side 40 of the bottom container 14 of the top spring assembly 10A.

FIG. 8 shows that the spring system 36 can include five spring assemblies 10. More or less such spring assemblies 10 can be used in the spring system 36 of the present invention according to the desired overall spring system behavior. FIG. 8 shows that the spring system 36 is positioned over damper 38, the damper 38 extending through the through-hole 18 of each of the spring assemblies 10 along the common axis A. The damper 38 can be configured so that it substantially fills the entirety of the through-hole 18 of each spring assembly 10, reducing movement of each spring assembly 10 transversely to the common axis A. The damper 38 can have a cylinder 44 (on the right of FIG. 8) and a rod 46 (on the left of FIG. 8), the cylinder 44 extending from the right to about the top container 16 of the second spring assembly 10 from the right in FIG. 8, the rod 46 then extending from the same position to the threaded portion of the rod 46 (adjacent the nut) on the left. A bottom support 48 and a top support 50 are positioned on either end of the spring system 36, as shown in FIG. 8, and can be secured to the damper 38.

During assembly, a single spring assembly 10 can be assembled by positioning the spring 12 in the bottom well 20 of the bottom container 14 and then by placing the top container 16 over the spring 12, positioning the spring 12 also in the top well 28 of the top container 16 (note, the terms "top" and "bottom" are used herein as a manner of relatively speaking, but it is understood that these terms are not to be interpreted as limiting the invention to such an orientation during application of the present invention). A plurality of such spring assemblies 10 can be inserted over the rod 46 and/or the cylinder 44 of damper 38, the support plates 48, 50 securing the spring assemblies 10 on the damper 38.

In use, a compressive force in the direction of arrow 34 can cause the top container 16 to press on spring 12 and thereby cause spring 12 to compress. If the spring 12 compresses a sufficient degree, then the top well 28 of the top container 16 can begin to telescopically receive and thus overlap the bottom well 20 of the bottom container 14. If a plurality of the spring assemblies 10 are stacked one on top of the other (as shown in FIG. 8), then the spring assemblies 10 act together in series to provide a spring system 36 that can be used in, for example, an automotive suspension. The damper 38 can then serve to dampen the spring oscillations of the spring system 36.

Figure 9:
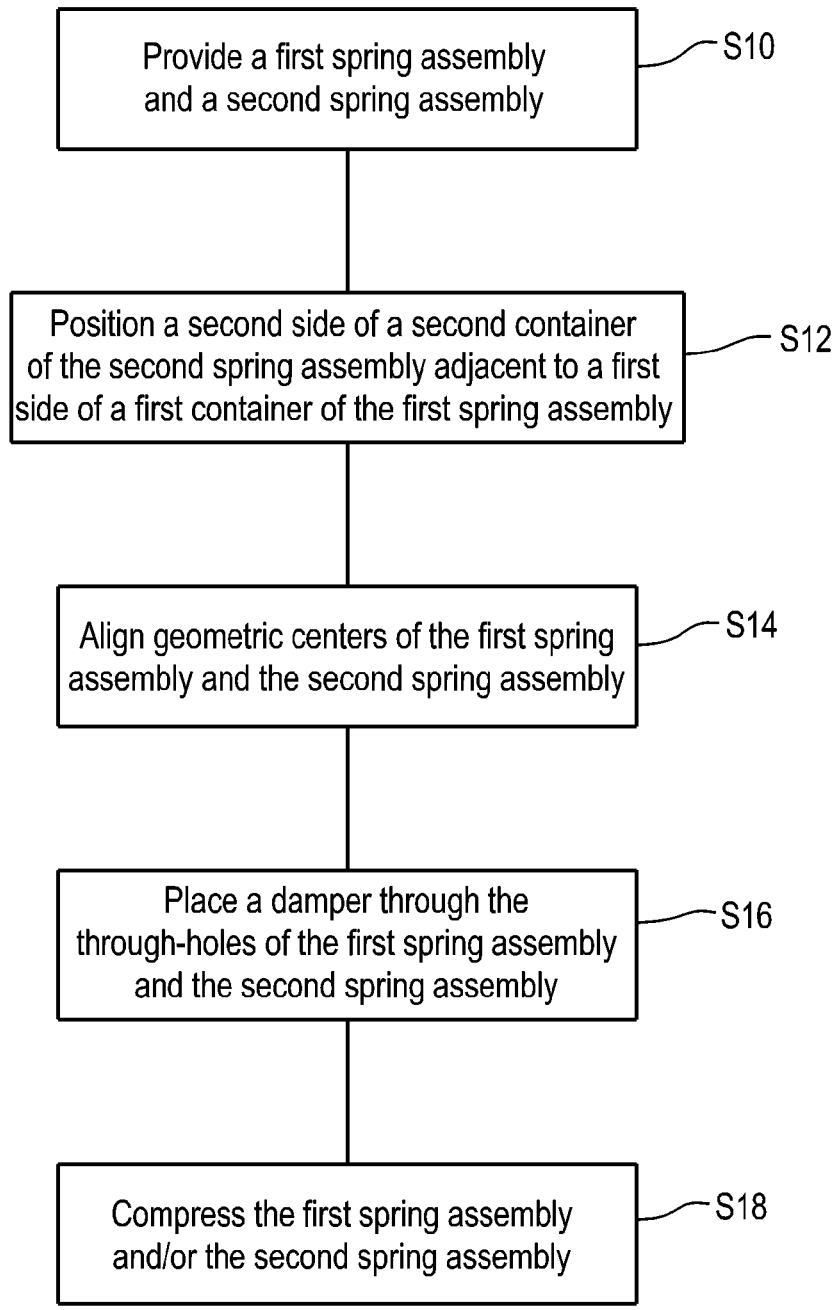
FIG. 9 is a flowchart illustrating a method of forming a spring system according to the present invention.

The present invention further provides a method of forming a spring system 36. FIG. 9 shows a flowchart diagram describing the steps to form the spring system 36. The method includes providing S10 a first spring assembly 10A (the top spring assembly) and a second spring assembly 10B (the bottom spring assembly). Each of the first spring assembly 10A and the second spring assembly 10B respectively include an annular spring 12; an annular first container 14 (the bottom container 14) including a first well 20 (the bottom well 20) and a first side 40 (the bottom side 40) opposing the first well 20; and an annular second container 16 (the top container 16) including a second well 28 (the top well 28) which can be substantially cup-shaped and a second side 42 (the top side 42) opposing the second well 28. The first well 20 and the second well 28 open towards one another and hold the spring 12 therebetween. The second well 28 is configured for telescopically receiving the first well 20 when the spring 12 is compressed. The first spring assembly 10A and/or the second spring assembly 10B can have a toroidal shape with a through-hole 18 and a respective geometric center C1. The second side 42 of the second container 16 of the second spring assembly 10B is positioned S12 adjacent to the first side 40 of the first container 14 of the first spring assembly 10A. Alternatively, or in addition thereto, the providing step S10 can provide that each of the first spring assembly 10A and the second spring assembly 10B are respectively a modular spring assembly 10. If desired, the first spring assembly 10A and the second spring assembly 10B can have their respective geometric centers C1 aligned S14 on a common axis A. The first spring assembly 10A and the second spring assembly 10B can then be held together S16 by placing a damper 38 through the through-holes 18 of the spring assemblies 10A, 10B along the common axis A. The first spring assembly 10A and/or the second spring assembly 10B can be compressed S18 in order to provide a pre-load to the spring system 36 or reduce the overall length of the spring system 36, if desired.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An annular spring assembly, comprising:
   an annular spring;
   an annular first container including a first well; and
   an annular second container including a second well, said first well and said second well being open towards one another and holding said spring therebetween, said second well being configured for telescopically receiving said first well when said spring is compressed, said annular second container including a second inner wall defining an inner boundary of said second well and a second through-hole and said annular first container including a first inner wall defining an inner boundary of said first well and said first inner wall further defining a recess configured to receive said second inner wall when said spring is compressed.

2. The annular spring assembly according to claim 1, wherein at least one of said annular spring, said annular first container and said annular second container has a toroidal shape.

3. The annular spring assembly according to claim 2, wherein said annular spring, said annular first container and said annular second container each have a geometric center, said geometric centers being aligned on a common axis.

4. The annular spring assembly according to claim 2, wherein said annular first container has a first outer radial distance and said annular second container has a second inner radial distance, said second inner radial distance being greater than said first outer radial distance.

5. The annular spring assembly according to claim 4, wherein said annular first container has a first inner diameter and said annular second container has a second inner diameter, said first inner diameter being equal to said second inner diameter.

6. The annular spring assembly according to claim 5, wherein said first inner diameter is configured to prevent further telescoping of said first well within said second well.

7. The annular spring assembly according to claim 4, wherein said first well has an inner well diameter and said annular second container has a second inner diameter, said inner well diameter being greater than said second inner diameter.

8. The annular spring assembly according to claim 7, wherein at least one gap is formed between said annular spring and at least one of said first well and said second well.

9. The annular spring assembly according to claim 8, wherein said annular spring is configured to expand into said at least one gap when compressed.

10. The annular spring assembly according to claim 9, wherein said annular spring includes at least one of an air spring, a urethane component, a microcellular urethane component, and a rubber component.

11. The annular spring assembly according to claim 1, wherein said second well is configured to telescopically receive said first well such that said annular spring does not expand outside of said second well.

12. A spring system, comprising:
a first spring assembly and a second spring assembly, each of said first spring assembly and said second spring assembly respectively including:
an annular spring;
an annular first container including a first well and a first side opposing said first well; and
an annular second container including a second well and a second side opposing said second well, said first well and said second well being open towards one another and holding said spring therebetween, said second well being configured for telescopically receiving said first well when said spring is compressed,
said second side of said second container of said second spring assembly being positioned adjacent to said first side of said first container of said first spring assembly, said annular second container including a second inner wall defining an inner boundary of said second well and a second through-hole and said annular first container including a first inner wall defining an inner boundary of said first well and said first inner wall further defining a recess configured to receive said second inner wall when said spring is compressed.

13. The spring system according to claim 12, wherein said first spring assembly and said second spring assembly each have a toroidal shape with a through-hole.

14. The spring system according to claim 13, wherein said first spring assembly has a first geometric center and said second spring assembly has a second geometric center, said first geometric center and said second geometric center lying on a common axis.

15. The spring system according to claim 14, further including a damper placed along said common axis.

16. A method of forming a spring system, said method comprising the steps of:
providing a first spring assembly and a second spring assembly, each of said first spring assembly and said second spring assembly respectively including:
an annular spring;
an annular first container including a first well and a first side opposing said first well; and
an annular second container including a second well and a second side opposing said second well, said first well and said second well being open towards one another and holding said spring therebetween, said second well being configured for telescopically receiving said first well when said spring is compressed; and
positioning said second side of said second container of said second spring assembly adjacent to said first side of said first container of said first spring assembly, said annular second container including a second inner wall defining an inner boundary of said second well and a second through-hole and said annular first container including a first inner wall defining an inner boundary of said first well and said first inner wall further defining a recess configured to receive said second inner wall when said spring is compressed.

17. The method according to claim 16, wherein said first spring assembly and said second spring assembly each have a toroidal shape with a through-hole.

18. The method according to claim 17, further including the step of aligning a first geometric center of said first spring assembly and a second geometric center of said second spring assembly on a common axis.

19. The method according to claim 18, further including the step of holding said first spring assembly and said second spring assembly together by placing a damper through said through-holes along said common axis.

20. The method according to claim 16, further including the step of compressing at least one of said first spring assembly and said second spring assembly.

* * * * *